United States Patent Office 3,047,607
Patented July 31, 1962

3,047,607
BORON CONTAINING PHOSPHORUS ESTERS
AND PROCESS FOR PREPARATION
Helen I. Thayer, Pittsburgh, Pa., assignor to Gulf Research & Development Company, Pittsburgh, Pa., a corporation of Delaware
No Drawing. Filed June 11, 1959, Ser. No. 819,569
17 Claims. (Cl. 260—461)

This invention relates to the production of novel compounds which are complex anhydrides of partially esterified orthophosphoric acids, including their thio analogues, and boric acid, boric oxide or anhydrides thereof with aliphatic monocarboxylic acids and to the method of preparing such compounds.

These complex anhydrides are useful as intermediates in the preparation of their amine adducts which are valuable improvement agents in one or more materials of the group of lubricating oils, gasolines, and distillate fuel oils.

I have found that valuable novel products are formed when a mono- or diester of an orthophosphoric acid or a thio analogue thereof having 1 to 2 organic substituents, at least one of whose organic substituents is a hydrocarbon radical that contains 5 to 22 carbon atoms, and the other of which, when present, is a hydrocarbon radical containing 1 to 22 carbon atoms, is reacted with a borylating agent such as boric acid, boric oxide or an acid anhydride of boric oxide and an aliphatic monocarboxylic acid, in the ratio of about 0.5 to about 6 moles of orthophosphoric acid ester per mole of borylating agent at conditions conducive to anhydride formation between the borylating agent and the orthophosphoric acid ester.

The class of partially esterified phosphoric acids whose use is included by the present invention can be represented by the general formula

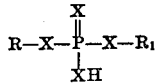

where R is a hydrocarbon radical containing 5 to 22 carbon atoms (preferably 6 to 12 carbon atoms), $R_1$ is hydrogen or a hydrocarbon radical containing 1 to 22 carbon atoms and X is oxygen or sulfur. The hydrocarbon substitutents can be open-chain and either saturated or unsaturated, or they can be cycloaliphatic or aromatic. These hydrocarbon substituents may contain substituent atoms, e.g., oxygen, phosphorus, nitrogen, sulfur and halogen, or substituent groups, e.g., nitro, amino, keto, or mercapto groups which do not adversely affect the mineral oil solubility or functional characteristics of the complex anhydrides.

The selection of the borylating agent is a matter of convenience. Boric acid, boric oxide and anhydrides of boric oxide and aliphatic monocarboxylic acids have been found useful for the purposes of this invention.

Boric oxide and the condensation products thereof with aliphatic monocarboxylic acids can be regarded as acid anhydrides. Boric oxide is formed by expelling three molecules of water from two molecules of orthoboric acid, thus:

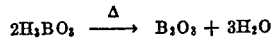

The acid anhydrides of boric oxide and aliphatic monocarboxylic acids are also formed in reactions that involve the elimination of water. Thus, the pyro derivative of boric oxide and acetic acid is formed by the elimination of two molecules of water in the reaction of acetic acid with boric oxide:

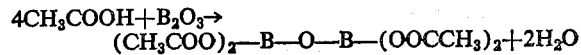

Any aliphatic monocarboxylic acid can be used in forming the borylating agent since the organic portion of the borylating agent does not enter the borophosphate anhydride molecule because it is eliminated in the condensation reaction. However, for practical reasons, borylating agents formed from boric oxide and unsubstituted $C_{1-8}$ monocarboxylic acids are preferred in the interest of facilitating separation of the by-products by distillation.

Any partially esterfied phosphoric acid of the class indicated above can be used in the preparation of the borophosphate anhydrides of this invention. Good results have been obtained with partially esterified phosphoric acids including ethyl lauryl monoacid orthophosphate, di(2-ethylhexyl) monoacid orthophosphate, mono-(2-ethylhexyl) diacid orthophosphate, di(n-octyl) monoacid orthophosphate, di(isooctylphenyl) dithiophosphate, di(n-amyl) monoacid orthophosphate, mono(n-octyl) diacid orthophosphate, etc. Especially outstanding results have been obtained with ethyl lauryl monoacid orthophosphate, mono-di(2-ethylhexyl) acid orthophosphate, di(p-isooctylphenyl) monoacid orthophosphate, di(p-isooctylphenyl) dithiophosphate, etc. Examples of other partially esterified orthophosphoric acids within the above indicated class include esters whose organic substituents are open-chain, saturated hydrocarbon radicals such as methyl octyl monoacid orthophosphate, di(2-methylhexyl) monoacid orthophosphate, di(n-octyl) monoacid orthophosphate, di(2-propylhexyl) monoacid orthophosphate, di(n-amyl) monoacid orthophosphate, dilauryl monoacid orthophosphate, lauryl cetyl monoacid orthophosphate, cetyl decyl monoacid orthophosphate; esters whose organic substituents are aromatic hydrocarbon radicals, such as lauryl phenyl monoacid orthophosphate, lauryl naphthyl monoacid orthophosphate; esters whose organic substituents are unsaturated hydrocarbon radicals such as dioctadecenyl monoacid orthophosphate; and esters whose organic substituents are cycloaliphatic hydrocarbon radicals, such as di(methylcyclohexyl) monoacid orthophosphate, dicyclohexyl monoacid orthophosphate, dicycloheptyl monoacid orthophosphate, di(ethylcyclohexyl) monoacid orthophosphate, di(ethylcycloheptyl) monoacid orthophosphate, and the corresponding thio or diacid analogues of the above listed phosphate esters. Examples of other partially esterified orthophosphoric acids within the above indicated class include esters such as phenyl tolyl monoacid orthophosphate, dibenzyl monoacid orthophosphate, distearyl monoacid orthophosphate, dinaphthyl monoacid orthophosphate, dicresyl monoacid orthophosphate, etc., and the corresponding thio analogues of such esters.

The orthophosphoric acid esters are conventional materials, and a number of them are commercially available. Accordingly, their method of preparation is not a part of this invention and it suffices to note that they can be prepared by reacting phosphorus pentoxide or phosphorus pentasulfide with alcohols or mercaptans, including thiophenols, in molecular proportions sufficient to give either mono- or diesterified compounds.

The process used in preparing the complex anhydrides of this invention varies somewhat depending on the borylating agent used. A general procedure in synthesizing these compounds when boric oxide or orthoboric acid is the borylating agent comprises refluxing a solution of the orthophosphoric acid ester in a solvent therefor, such as benzene, in the presence of the borylating agent in the proportions indicated above. Neither boric acid nor boric oxide is appreciably soluble in benzene, but each gradually disappears as the reaction progresses. Refluxing is continued until no more water is formed, usually between 0.5 and 24 hours. Any unreacted borylating agent is removed by filtration and the product recovered by distillation to remove the solvent. The procedure differs when an acid anhydride of boric oxide and an aliphatic monocarboxylic acid is used as the borylating agent in that the reaction progresses satisfactorily in the absence of a solvent. The boric oxide-carboxylic acid anhydride may be heated with the partially esterified phosphoric acid until the reaction is complete. The organic monocarboxylic acid formed as a by-product of the reaction is removed by distillation and the complex anhydride product is recovered.

The thio analogues of the complex anhydrides of this invention are synthesized most conveniently in the presence of a solvent for the thiophosphate ester. The procedure is similar to the borylation of the partially esterified orthophosphoric acids with boric acid or boric oxide. The partially esterified thiophosphate is refluxed in the presence of a solvent, such as pentane, until hydrogen sulfide ceases to be evolved. The solvent is then removed and the product is recovered.

The reaction of partially esterified orthophosphoric or thiophosphoric acids with borylating agents takes place with relative ease at moderately elevated temperatures and is most conveniently carried out at atmospheric pressure. The temperature at which the reaction is carried out varies with the borylating agent and the nature of the by-product evolved in the reaction and in each case must be high enough to drive off the by-product formed (water, aliphatic monocarboxylic acid, or hydrogen sulfide), but below the decomposition temperature of the product. Thus, the temperature may be as low as 35° C. if pentane is the solvent and hydrogen sulfide is evolved, or may be as high as 145° C. when water is evolved and a higher boiling solvent such as toluene or xylene is used. The invention is not limited to the use of pentane or benzene. Any low boiling inert solvent can be used.

It is most convenient to carry out the foregoing reactions at atmospheric pressure and no apparent advantage is derived from increasing or decreasing the pressure.

The time for the reaction will vary with the borylating agent. Thus, the reaction as carried out with the anhydride of boric oxide and acetic acid as the borylating agent is very rapid and is essentially complete in less than 1 hour, for example, the reaction will normally be substantially complete in 30 minutes. In the borylation of some of the partially esterified orthophosphoric acids in the presence of benzene some water may be evolved for as long as 24 hours, the refluxing being carried out at the boiling point of benzene. However, the reaction is normally substantially complete in 6 hours or less.

The products of this invention are light colored, normally yellowish, oily, acidic materials soluble in mineral oil. Usually, they will have about 5 to 10 molecular equivalents of acid per molecule. Available analytical data suggest that the products of this invention may comprise one or more kinds of borylated phosphoric anhydride molecular structures. Data indicative of the structure of two typical complex anhydride products of this invention are summarized in Table I below:

comprise a product of the following structure or its equivalent:

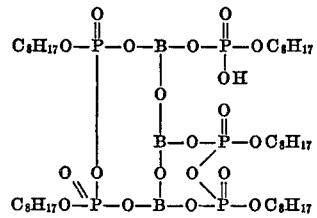

The data in Table I suggest an approximate empirical formula for the second product listed in the table corresponding to $C_{42}H_{92}B_3O_{16}P_3$, which may comprise a product of the following structure or its equivalent:

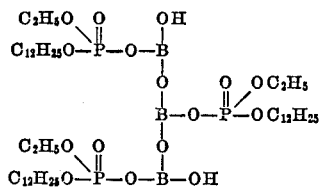

The preparation and character of the complex anhydrides of this invention can be further illustrated by the following examples.

*Example 1*

A benzene solution of 30.9 grams (0.10 mole) of mixed mono-dioctyl orthophosphate, a mixture of 30% mono- and 60% dioctyl esters, was added to a 500 milliliter distillation flask equipped with a Dean-Stark trap and a reflux condenser. A charge of 8.1 grams (0.13 mole) of boric acid and 100 milliliters of benzene were added. The slurry was heated to 80° C., the reflux temperature, and maintained at that temperature throughout the reaction. The boric acid was not appreciably soluble in benzene but gradually disappeared as the reaction progressed. The progress of the reaction was followed by visual observation of the amount of water which was azeotroping into the Dean-Stark trap. After 24 hours no more water seemed to be collecting in this trap so the reaction was assumed to be complete. A total of 5 milliliters (0.28 mole) of water was collected in the trap during this period. The slurry was allowed to cool to room temperature and was filtered to remove the unreacted boric acid. The benzene was removed by distillation at its boiling point leaving the amber-colored semi-solid product in the distillation flask. This product was found to be soluble in oil, but not appreciably soluble in gasoline. The neutral equivalent of the product (using phenolphthalein as an end point) was found to be 281. Neutral equivalent is defined as that amount of material (in grams) which will furnish one gramionic weight of hydrogen ion or will react with one equivalent (56.10 grams) of potassium hydroxide.

TABLE I

| | Moles Phosphate per Molecule Formed | Boron Atoms per Molecule | Equivalents of Acid per Molecule | Moles Water Formed per Mole of Phosphate | Molecular Weight (extrapolated) |
|---|---|---|---|---|---|
| I. Product of the reaction of 2.0 moles of Monooctyl diacid orthophosphate with 1.0 mole of boric oxide | 5 | 2.9 | 9.4 | 1 | 1090 |
| II. Product of the reaction of 1.0 mole of ethyl lauryl monoacid orthophosphate with 1.0 mole of boric oxide | 2.7 | 3.3 | 6.0 | 1 | 952 |

These data suggest an approximate empirical formula for the first-mentioned product in the table of:

Products corresponding to this empirical formula may

*Example 2*

The method of preparation used when boron acetate (the pyro derivative

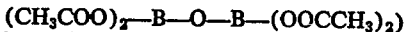

was used as a borylating agent is as follows:

A charge of 42.8 grams (0.15 mole) of mono-di(2-ethylhexyl) orthophosphate, a mixture of 25% mono- and 75% diester was added to a 500 milliliter distillation flask equipped with a reflux condenser. The anhydride of acetic acid and boric oxide (13.8 grams, 0.0504 mole) was added and the mixture heated to 100° C. Heating was continued at this temperature and atmospheric pressure for 45 minutes; the slurry was allowed to cool and the flask equipped for distillation at reduced pressure. The slurry was then heated to 100° C. at 20 millimeters' pressure for 1 hour. Approximately 3 milliliters of a distillate having a strong odor of acetic acid was collected during the distillation. The product remaining in the reaction vessel was cooled and filtered. The analysis of the product was as follows:

Boron, 2.17 percent
Phosphorus, 11.24 percent

This product was soluble in gasoline and oil.

The thiophosphate derivatives are prepared as follows:

*Example 3*

A charge of 1 mole (206.3 grams) of p-isooctylphenol was added to a 500 milliliter flask and heated to 115° C. A predetermined amount of phosphorus pentasulfide (0.125 mole, 55.5 grams) was added in small increments. The temperature during the reaction was maintained at 130° to 145° C. by slow addition and vigorous stirring over a period of 3 hours. The crude product was filtered hot through glass wool and a sample removed for analysis. A portion of this product (61.7 grams, 0.10 mole) was transferred to a 500 milliliter flask containing 125 milliliters of benzene and 7 grams (0.10 mole) of boric oxide was added. The mixture was heated to 80° C., the boiling point of benzene, and refluxed at this temperature for 22.5 hours. The product was filtered to remove solids still present in the reaction mixture and the solvent removed by distillation. The analysis of the product was as follows:

Sulfur, 5.79 percent
Boron, 1.22 percent
Neutral equivalent, 415

Specific embodiments of other complex anhydrides of this invention that have been prepared substantially in accordance with the procedure described in the preceding examples are illustrated in Table II below:

such reaction products and certain uses thereof are disclosed in detail in my copending applications Serial No. 819,566, Serial No. 819,567, and Serial No. 819,568, each filed concurrently herewith.

While my invention is described with reference to various specific examples and embodiments, it will be understood that the invention is not limited to such examples and embodiments, and may be variously practiced within the scope of the claims hereinafter made.

I claim:

1. A process comprising reacting at least one member selected from the group consisting of partially esterified orthophosphoric acid esters and the thio analogues thereof that contain 1 to 2 organic substituents per molecule, at least one of which is a hydrocarbon radical containing 5 to 22 carbon atoms and the other of which, when present, is a hydrocarbon radical containing 1 to 22 carbon atoms, each of said hydrocarbon radicals being a member selected from the group consisting of alkyl, cycloalkyl, and alkenyl radicals and monovalent mono- and dinuclear aromatic radicals, with a borylating agent selected from the group consisting of boric acid, boric oxide and an anhydride of boric oxide and an aliphatic monocarboxylic acid, in the range of about 0.5 to about 6 moles of phosphoric acid ester per mole of borylating agent under conditions conducive to anhydride formation between the borylating agent and the phosphoric acid ester.

2. A process comprising reacting at least one phosphoric acid ester selected from the group consisting of mono- and diphosphoric acid esters and their thio analogues containing 1 to 2 organic substituents, at least one of which is a hydrocarbon radical containing 5 to 22 carbon atoms and the other of which, when present, is a hydrocarbon radical containing 1 to 22 carbon atoms, each of said hydrocarbon radicals being a member selected from the group consisting of alkyl, cycloalkyl, and alkenyl radicals and monovalent mono- and di-nuclear aromatic radicals, with a borylating agent selected from the group consisting of boric acid, boric oxide and anhydrides of boric oxide and an aliphatic monocarboxylic acid in the range of about 0.5 to about 6 moles of phosphoric acid ester per mole of borylating agent at a temperature of 50° to 145° C. in the presence of a solvent for a period of about 0.5 to about 24 hours.

3. The process of claim 1 wherein the phosphoric acid ester is ethyl lauryl monoacid orthophosphate, the borylating agent is boric oxide and the reactants are reacted

TABLE II

| Example | Phosphate | Borylating Agent | Proportions (in Moles) | Temperature, °C. | Solvent | Time, Hrs. |
| --- | --- | --- | --- | --- | --- | --- |
| 4 | Mono-di(2-ethylhexyl) orthophosphate (25-75) | boric oxide | 3.1:1.0 | 80 | benzene | 24 |
| 5 | Mono-dioctyl orthophosphate (30-60) | boric acid | 0.78:1.0 | 80 | do | 24 |
| 6 | Mono-di(2-ethylhexyl) orthophosphate (25-75) | boric oxide | 1.2:1.0 | 80 | do | 19 |
| 7 | do | do | 3.1:1.0 | 80 | do | 22 |
| 8 | do | do | 3.1:1.0 | 80 | do | 22.5 |
| 9 | do | do | 3.1:1.0 | 80 | do | 20 |
| 10 | Mono-diamyl orthophosphate (60-30) | do | 3.2:1.0 | 80 | do | 21 |
| 11 | Monooctyl diacid orthophosphate | do | 2.0:1.0 | 80 | do | 24 |
| 12 | Ethyl lauryl monoacid orthophosphate | do | 1.0:1.0 | 80 | do | 54 |
| 13 | Di(p-isooctylphenyl) dithiophosphoric acid | do | 1.0:1.0 | 80 | do | 22.5 |
| 14 | do | do | 1.0:1.0 | 80 | do | 48 |
| 15 | do | boron acetate | 4.0:1.0 | 73 to 110 | none | 4.0 |

There can be substituted in the above specific examples, in the same or equivalent proportions, other equivalent materials, disclosed herein, for example, ethyl octyl monoacid orthophosphate, di(2-methylhexyl) monoacid orthophosphate, di(2-propylhexyl) monoacid orthophosphate, lauryl cetyl monoacid orthophosphate, cetyl decyl monoacid orthophosphate, phenyl tolyl monoacid orthophosphate, dibenzyl monoacid orthophosphate, distearyl monoacid orthophosphate, dinaphthyl monoacid orthophosphate, or their diacid or thio analogues.

These compounds are useful in forming reaction products with amines, which reaction products are useful as petroleum oil improvement agents. The preparation of in the proportions of 1 mole of said ester to 1 mole of said borylating agent.

4. The process of claim 1 wherein the phosphoric acid ester is mono-di(2-ethylhexyl) orthophosphate, the borylating agent is the anhydride of boric oxide and acetic acid and the reactants are reacted in the proportions of 3 moles of said ester to 1 mole of said borylating agent.

5. The process of claim 1 wherein the phosphoric acid ester is di(p-isooctylphenyl) dithiophosphate, the borylating agent is boric oxide and the reactants are reacted in the proportions of 1 mole of said ester to 1 mole of said borylating agent.

6. The process of claim 1 wherein the phosphoric acid ester is mono-di(2-ethylhexyl) orthophosphate, the borylating agent is boric oxide and the reactants are reacted in the proportions of 1 to 3 moles of said ester to 1 mole of said borylating agent.

7. The process of claim 1 wherein the phosphoric acid ester is mono-dioctyl orthophosphate, the borylating agent is boric acid and the reactants are reacted in the proportions of 0.8 mole of said ester to 1 mole of said borylating agent.

8. The process of claim 1 wherein the phosphoric acid ester is monooctyl diacid orthophosphate, the borylating agent is boric oxide and the reactants are reacted in the proportions of 2 moles of said ester to 1 mole of said borylating agent.

9. The process of claim 1 wherein the phosphoric acid ester is di(p-isooctylphenyl) dithiophosphoric acid, the borylating agent is the anhydride of boric oxide and acetic acid and the reactants are reacted in the proportions of 4 moles of said ester to 1 mole of said borylating agent.

10. The product prepared in accordance with the process of claim 1.

11. The product prepared in accordance with the process of claim 1 wherein the phosphoric acid ester is ethyl lauryl monoacid orthophosphate, the borylating agent is boric oxide and the reactants are reacted in the proportions of 1 mole of said ester to 1 mole of said borylating agent.

12. The product prepared in accordance with the process of claim 1 wherein the phosphoric acid ester is mono-di(2-ethylhexyl) orthophosphate, the borylating agent is the anhydride of boric oxide and acetic acid and the reactants are reacted in the proportions of 3 moles of said ester to 1 mole of said borylating agent.

13. The product prepared in accordance with the process of claim 1 wherein the phosphoric acid ester is di(p-isooctylphenyl)dithiophosphate, the borylating agent is boric oxide and the reactants are reacted in the proportions of 1 mole of said ester to 1 mole of said borylating agent.

14. The product prepared in accordance with the process of claim 1 wherein the phosphoric acid ester is mono-di(2-ethylhexyl) orthophosphate, the borylating agent is boric oxide and the reactants are reacted in the proportions of 1 to 3 moles of said ester to 1 mole of said borylating agent.

15. The product prepared in accordance with the process of claim 1 wherein the phosphoric acid ester is mono-dioctyl orthophosphate, the borylating agent is boric acid and the reactants are reacted in the proportions of 0.8 mole of said ester to 1 mole of said borylating agent.

16. The product prepared in accordance with the process of claim 1 wherein the phosphoric acid ester is monooctyl diacid orthophosphate, the borylating agent is boric oxide and the reactants are reacted in the proportions of 2 moles of said ester to 1 mole of said borylating agent.

17. The product prepared in accordance with the process of claim 1 wherein the phosphoric acid ester is di(p-isooctylphenyl) dithiophosphoric acid, the borylating agent is the anhydride of boric oxide and acetic acid and the reactants are reacted in the proportions of 4 moles of said ester to 1 mole of said borylating agent.

References Cited in the file of this patent

UNITED STATES PATENTS 2,648,696    Whetstone    Aug. 11, 1953

OTHER REFERENCES

Richter: Textbook of Organic Chemistry, 180–183 (1938 Edition), John Wiley and Sons, Inc., New York, New York.